UNITED STATES PATENT OFFICE 2,415,431

METHOD OF PROCESSING WOOD FOR THE RAPID MATURATION AND AGING OF TABLE WINES

Ernst T. Krebs, San Francisco, Calif.

No Drawing. Application December 19, 1944, Serial No. 568,931

5 Claims. (Cl. 99—48)

This invention relates to a method of processing wood for the rapid aging and maturation of table wines.

I have disclosed in my co-pending application, "Method of processing wood for the rapid maturation of whiskey and other alcoholic liquors and wines," filed December 19, 1944, Serial No. 568,930, the fact that oak wood contains spores and fungi which when activated into profuse growth have the property of aging or maturing alcoholic liquors and wines; that is, the product of the growth resulting from the activation of the spores and fungi brings about rapid maturation and aging of liquors and wines and increases the development of flavor and bouquet.

More specifically stated, my co-pending application discloses that the cryptogamic spores when properly activated bring about a profuse cryptogamic growth which has been classified as mainly belonging to the rhizopus. The rhizopus growth in turn secretes an enzyme complex which is rich in tannase, while the growth itself is rich in aminosuccinamides. Upon addition of liquor or wine the aminosuccinamides are dissolved and dissociated into succinic and succinamic acids and amino groups which combine with the higher alcohols to form esters and also to promote oxidation. The tannase hydrolizes the tannins in the wood thereby forming acids different from the tannins which acids also combine with the higher alcohol to form additional esters.

The method of processing wood as above described is particularly intended for aging or maturing whiskey, brandies or liquors of high alcoholic content and also for aging wines, but I have discovered that better results are obtained when the processed wood is applied to table wines such as claret, burgundy, white wine, sparkling wines, etc., if the processing of the wood is modified will hereinafter be described.

My co-pending application also discloses the fact that hormones are very essential and are depended upon to activate the rhizopus spores into profuse growth. The source of hormones specified is acorn meal but the application also mentions that other sources are seeds and grains, etc.

I have now discovered that grape pulp from the wine press containing the skins and seeds of the grapes or the juice itself contains a sufficient quantity of hormones to activate the rhizopus spores into prolific growth and that by using the pulp or the juice itself, no foreign matter is added in the process of aging wine.

I have also discovered that other fruit pulps or their juices when fully ripe may be added to the oak wood, thus supplying a proper media as well as hormones to activate the rhizopus spore growth. Vegetable juices containing hormones may also be employed; for instance, asparagus juice, juices from the sprouts of germinating seeds or synthetic hormones may be used alone or combined to activate the rhizopus spores of the oak wood into growth; however, the addition of fresh acorn meal greatly facilitates activation of the rhizopus growth.

The process of aging table wines can be accomplished by any method which develops a profuse rhizopus growth on a proper media such as white oak wood shavings or finely cut chips. Hormones are of course required to activate such growth; however, it makes little difference if the hormones are supplied through the use of seeds or grains, kernels or nuts such as acorns or vegetable juices from asparagus or other sources or the watery extracts from seeds or the juice or pulp of fruits or grapes or a combination of any of these.

The process for the aging of table wine may be conducted as follows:

Equal parts more or less of fresh grape juice and an aqueous extract of ground barley is poured over a predetermined quantity of finely cut white oak chips or shavings, the quantity of liquid applied being just sufficient to make the wood or shavings quite moist but not too wet. After the liquid is applied and the shavings have been well mixed they are placed in a covered non-metallic container, the quantity employed being just sufficient to substantially half fill the same. The container is maintained at a room temperature of about 80° F. The rhizopus spores contained in the oak wood are activated under this temperature by the hormones present in the grape juice and in the aqueous extract of the ground barley and growth of the spores should appear in about three to four days although it may not be visible to the naked eye. In about four to five days the rhizopus spores will have developed a luxurious growth and at this stage may be transferred to a tightly closed non-metallic container and the temperature should now be raised to about 90° F. In a few days the pulp first develops a fragrant fruity odor and after a few more days a pleasant sour odor predominates. The pulp is subjected to fermentation during this period and when a decided acid reaction is obtained the pulp is ready to be added to new wine to be aged and matured.

A simple test to determine when the acidity is fully developed will be as follows: Digest a small quantity of the processed wood in several times its volume of one-hundred proof alcohol for about twenty-four hours. To this solution add Benedict's solution in the amount of three or four volumes and when boiled it should not give a reaction for sugar.

The amount of the wood thus processed and the length of time the new wine should macerate on the processed wood is best determined by a connoisseur because it depends on a number of factors; first the degree to which the wood pulp has been fermented, or in other words, upon the acid content developed; second, it depends upon the kind of grapes used, the acidity and the alcoholic content of the wine; third, it depends upon the type of aroma and flavor desired, etc.

When the wine has macerated on the processed wood for one or two days it is drawn off, filtered and bottled. The wine continues to esterify and become mellow in the bottles for several weeks.

Another method of processing wood for the purpose of aging and maturing wine may be conducted as follows:

If a predetermined quantity of wood is required for a certain batch of new wine let it be assumed that the bulk of wood required is ten cubic feet. If that is the case fifteen to twenty per cent of the bulk may be the skin and seeds of grapes or in other words, the pulp from a wine press. To this is added finely cut chips of wood shavings in a sufficient quantity to bring the total bulk up to ten cubic feet or in other words one-hundred per cent; stating it otherwise, about two cubic feet of grape pulp is used and eight cubic feet of wood shavings. To this is added ordinary boiled tap water in a quantity sufficient to make the total mixture of pulp and wood fairly moist but not wet. The moistened mixture of shavings and grape pulp is now placed in a closed container and maintained at a temperature of approximately 80° F. The grape pulp, to wit, the skin and seeds of the grapes contains a sufficient amount of hormones to insure activation of the rhizopus spores contained in the wood and in a short time the spores begin to grow. In four to six days the rhizopus growth should be fully developed and if this is the case the whole mixture is transferred to a tight container and then subjected to a temperature of approximately 90° F. Fermentation commences in a short time and first develops a fragrant fruity odor and thereafter a pleasant sour odor. The fermentation increases the acid content of the wood and when it has become decidedly acid it is ready to be added to the new wine to be aged and matured. Again it may be stated that the amount of processed wood and the length of time that the new wine should macerate on the wood is determined entirely by the factors previously stated.

In some instances I have found that about four ounces of processed wood, whether made by the first or second process, is the approximate quantity required to mature and age one gallon of wine. When the wood is mixed with the new wine it is left to macerate in a closed container for one or two days with occasional stirring of the contents. When the wine has properly developed it may be filtered and bottled as previously stated.

If an aqueous extract of seed, for instance, barley is to be employed because of its growth activating hormone content the seed or barley is ground and mixed at the ratio of for instance, one pound of finely ground barley to six to eight pounds of water. This mixture is permitted to soak for about twelve hours and the water may then be drawn off and applied to the oak chips or shaving. Acorn meal is rich in growth activating hormones and may be mixed with the oak wood chips or shavings in addition to aqueous extracts, fruit pulp, fruit juices, etc. If grape or fruit pulp is employed it is preferable to grind the same as the seed is also a source of hormone and tannin supply.

Having thus described my invention, what I claim and desire to secure by Letters Patent is:

1. A method of processing wood to accelerate the aging and maturing of table wines or the like, said wood containnig cryptogamic spores and tannin, comprising moistening the wood in the form of thin chips or shavings with water containing vegetable hormones which activate the growth of the cryptogamic spores, placing the moistened wood in a container, subjecting it to a temperature which promotes a prolific cryptogamic growth, and after said growth is fully developed, subjecting the wood to a temperature sufficiently high to promote fermentation, continuing fermentation until a decided acid reaction is obtained, and then mixing the processed wood with new wine to promote rapid oxidation, aldehydation and esterification of certain of the wine components.

2. A method of processing wood to accelerate the aging and maturing of table wines and the like, said wood containing cryptogamic spores and tannin, comprising, mixing the wood in the form of thin chips or shavings with ground seeds and skins of grape pulp, said grape pulp containing hormones which activate the growth of the cryptogamic spores, moistening the mixed grape pulp and wood with water, placing the moistened mixture of grape pulp and wood in a container, subjecting it to a temperature which promotes a prolific cryptogamic growth, and after said growth is fully developed, subjecting the wood to a temperature sufficiently high to promote fermentation, continuing fermentation until a decided acid reaction is obtained, and then mixing the processed wood with new wine to promote rapid oxidation, aldehydation and esterification of certain of the wine components.

3. A method of processing wood to accelerate the aging and maturing of alcoholic table wines and the like, said wood containing cryptogamic spores and tannin, comprising, moistening the wood in the form of thin chips or shavings by adding grape juice and an aqueous extract of seeds, said extract and juice containing hormones which activate the growth of the cryptogamic spores, placing the moistened wood in a container,. subjecting it to a temperature which promotes a prolific cryptogamic growth, and after said growth is fully developed, subjecting the wood to a temperature sufficiently high to promote fermentation, continuing fermentation until a decided acid reaction is obtained, and then mixing the processed wood with new wine to promote rapid oxidation, aldehydation and esterification of certain of the wine components.

4. A method of processing wood to accelerate the aging and maturing of table wines and the like, said wood containing cryptogamic spores and tannin, comprising, mixing the wood in the form of thin chips or shavings with fruit pulp, moistening the mixed wood and fruit pulp with the juice of the fruit and with an aqueous extract of seeds, said pulp together with the aqueous extract and the juice containing vegetable hormones which activate growth of the spores, placing the moistened mixture of wood and fruit pulp in a container, subjecting it to a temperature which promotes rapid growth of the cryptogamic spores and after said growth is fully developed and the tannin is substantially dissociated subjecting the mixed wood and pulp to a temperature sufficiently high to promote fermentation, continuing fermentation until a decided acid reaction is obtained and then mixing the processed wood and pulp with new fruit wine to provide rapid oxidation, aldehydation and esterification of certain of the fruit wine components.

5. A method of processing wood to accelerate the aging and maturing of table wines or the like, said wood containing cryptogamic spores and tannin, comprising, moistening the wood in the form of thin chips or shavings with a growth activating synthetic hormone, placing the moistened wood in a container, subjecting it to a temperature which promotes a prolific cryptogamic growth, and after said growth is fully developed, subjecting the wood to a temperature sufficiently high to promote fermentation, continuing fermentation until a decided acid reaction is obtained, and then mixing the processed wood with new wine to promote rapid oxidation, aldehydation and esterification of certain of the wine components.

ERNST T. KREBS.

REFERENCES CITED

The following references are of record in the file of this patent:

UNITED STATES PATENTS

| Number | Name | Date |
| --- | --- | --- |
| 2,224,352 | Krebs et al. | Dec. 10, 1940 |
| Re. 21,589 | Krebs et al. | Oct. 1, 1940 |
| 2,347,783 | Krebs | May 2, 1944 |
| 2,119,234 | Krebs et al. | May 31, 1938 |